(12) United States Patent
Krome et al.

(10) Patent No.: US 11,035,676 B2
(45) Date of Patent: Jun. 15, 2021

(54) NAVIGATION SYSTEM AND METHOD FOR PROVIDING NAVIGATIONAL ASSISTANCE AT A VENUE

(71) Applicant: HERE Global B.V., Eindhoven (NL)

(72) Inventors: Sven Krome, Berlin (DE); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 359 days.

(21) Appl. No.: 16/004,922

(22) Filed: Jun. 11, 2018

(65) Prior Publication Data
US 2019/0376793 A1    Dec. 12, 2019

(51) Int. Cl.
*G01C 21/20* (2006.01)
*G01C 21/16* (2006.01)

(52) U.S. Cl.
CPC ........... *G01C 21/206* (2013.01); *G01C 21/16* (2013.01)

(58) Field of Classification Search
CPC ............................. G01C 21/20; G01C 21/206
See application file for complete search history.

(56) References Cited

U.S. PATENT DOCUMENTS

| | | |
|---|---|---|
| 9,161,174 B2 | 10/2015 | Parrish et al. |
| 9,846,041 B2 | 12/2017 | Silverstein |
| 9,891,056 B2 | 2/2018 | Xu et al. |
| 2009/0112461 A1 | 4/2009 | Murphy |
| 2012/0254084 A1 | 10/2012 | Richter et al. |
| 2015/0057837 A1* | 2/2015 | Moore, Jr. ......... G06Q 30/0645 701/2 |
| 2015/0369611 A1 | 12/2015 | Ogishi |
| 2016/0189111 A1 | 1/2016 | Bookallil et al. |
| 2016/0066141 A1* | 3/2016 | Jain ....................... H04W 4/021 455/456.1 |
| 2016/0094944 A1* | 3/2016 | Kong ..................... H04W 4/022 455/456.1 |

(Continued)

FOREIGN PATENT DOCUMENTS

DE    102007029685 A1 *   1/2009   ............. G01C 21/30

OTHER PUBLICATIONS

Hao Xia et al "Using Smart Phone Sensors to Detect Transportation Modes"; 35 pages (Year: 2014).*

(Continued)

*Primary Examiner* — Kira Nguyen
(74) *Attorney, Agent, or Firm* — Alston & Bird LLP

(57) ABSTRACT

A navigation system, method and computer program product are provided to provide navigational assistance at a venue. The navigation system is configured to obtain information regarding the venue to be navigated by a user including a plurality of waypoints at the venue. The navigation system is also configured to determine a time to be expended by the user between respective pairs of the waypoints at the venue. Based on the time and a rate of travel of the user, the navigation system is configured to determine one or more points of interest that are accessible by the user between at least one pair of waypoints. The navigation system is further configured to cause presentation of a representation of the venue including the plurality of waypoints and the one or more points of interest that are accessible by the user between the at least one pair of waypoints.

20 Claims, 8 Drawing Sheets

(56) References Cited

U.S. PATENT DOCUMENTS

| | | | |
|---|---|---|---|
| 2016/0116292 A1* | 4/2016 | An | H04W 4/024 |
| | | | 701/454 |
| 2017/0003137 A1* | 1/2017 | Scofield | G01C 21/3423 |
| 2017/0023368 A1 | 1/2017 | Guse | |
| 2017/0108339 A1* | 4/2017 | Silverstein | G01S 5/0054 |
| 2019/0376793 A1* | 12/2019 | Krome | G01C 21/16 |

OTHER PUBLICATIONS

Sita "Smart Airport of the Future Planning for Innovation at Airports" [online] [retrieved Jun. 27, 2018]. Retrieved from the Internet:<URL:https://www.sita.aero/globalassests/docs/events/2016-south- africa-innovation-day/4-sita-jnb-innovation-day-aug-16-innovation.pdf> (dated 2016).

* cited by examiner

NAVIGATION SYSTEM AND METHOD FOR PROVIDING NAVIGATIONAL ASSISTANCE AT A VENUE

TECHNOLOGICAL FIELD

An example embodiment relates generally to a navigation system, method and computer program product and, more particularly, to a navigation system, method and computer program product configured to provide navigational assistance at a venue.

BACKGROUND

People routinely visit or travel through a number of different venues. For example, travelers routinely visit airports, train stations and the like in order to board, disembark from or change aircraft, trains or the like. While at the various venues, many people desire to make effective use of their time, such as by moving through the venue in an efficient manner so as to arrive at their intended destination in a timely manner. To the extent that a person has additional time to expend at the venue, some people are interested in information regarding points of interest (POIs) at the venue, such as entertainment options, dining options, shopping options or the like.

With reference by way of example to airports, airports generally include a plurality of standard waypoints, such as a waypoint at which the traveler checks in, a waypoint at which the traveler proceeds through the security checkpoint, a waypoint associated with passport control in the case of international travel and a waypoint associated with the gate at which the traveler's flight will depart or arrive. Although airports generally have the same type of waypoints, the configuration of the airports may vary dramatically with significant differences in the size and scale of the airport and, accordingly, large differences in the time required to walk from one waypoint to the next waypoint. Different airports also have a wide variety in the entertainment, dining, shopping and other options for the traveler to experience between the various waypoints.

Some travelers may simply wander through the airport while heading in the general direction of their gate in hopes of finding an option that is appealing, such as their favorite restaurant or a store selling a product that the traveler desires. Not only is such an approach relatively inefficient, but a traveler may underestimate the time required to arrive at the gate from which their flight departs and may, in some instances, miss their flight, thereby creating inefficiencies and, in some instances, additional costs for the traveler, the airline or the like.

Many airports or mapping services provide maps of airports. As such, a traveler may reference the map in an effort to more directly proceed to their gate and to more quickly identify POIs that are of interest. However, airport maps are generally static and subject to the interpretation of the traveler in terms of the distance that a traveler may deviate to reach a POI. As such, some travelers still deviate too far from the path to the gate from which their flight will leave in an effort to avail themselves to a desired option and may have difficulty arriving at their gate in a timely manner, thereby potentially missing their flight. For example, a traveler may believe that they are able to walk to a particular restaurant for lunch while still having time to reach their gate in time for the scheduled departure of their flight. Even with reference to an airport map to plot the most efficient route to the restaurant and then, in turn, to their gate, a traveler may either underestimate the distance to the restaurant and/or may fail to appreciate that the foot traffic within the airport is much greater on their day of travel than on other days in which the traveler has passed through the same airport and, as such, may fail to appreciate that their walking time and the time expended in the restaurant is greater than normal, thereby resulting in the traveler failing to arrive at their gate in a timely manner, notwithstanding the traveler's reference to the airport map.

BRIEF SUMMARY

A navigation system, method and computer program product are provided in accordance with an example embodiment in order to provide navigational assistance at a venue. In this regard, the navigation system, method and computer program product take into account a variety of contextual information in order to provide relevant and accurate information. For example, the navigation system, method and computer program product may take into account the rate of travel of the user throughout the venue in order to determine points of interest that are accessible to the user and, some embodiments, the permissible dwell time for which the user may remain at a point of interest. Thus, the navigation system, method and computer program product of an example embodiment may facilitate the identification of points of interest that may be feasibly visited by the user while still arriving at their intended destination in a timely manner.

In an example embodiment, a navigation system is provided that is configured to provide navigational assistance at a venue. The navigation system includes at least one processor and at least one memory including computer program code with the at least one memory and the computer program code configured to, with the processor, cause the navigation system to at least obtain information regarding the venue to be navigated by a user including a plurality of waypoints at the venue. The at least one memory and the computer program code are also configured to, with the processor, cause the navigation system to determine a time to be expended by the user between respective pairs of the waypoints at the venue. Based on the time and a rate of travel of the user, the at least one memory and the computer program code are configured to, with the processor, cause the navigation system to determine one or more points of interest that are accessible by the user between at least one pair of waypoints. The at least one memory and the computer program code are further configured to, with the processor, cause the navigation system to cause presentation of a representation of the venue including the plurality of waypoints and the one or more points of interest that are accessible by the user between the at least one pair of waypoints. In an example embodiment, the at the one memory and the computer program code are also configured to, with the processor, cause the navigation system to determine a permissible dwell time at a respective point of interest based on the time, the rate of travel of the user and a distance to the respective point of interest.

The at least one memory and the computer program code are configured to, with the processor, cause the navigation system of an example embodiment to determine one or more points of interest by defining an opportunity space between a first pair of waypoints based on the time to be expended between the first pair of waypoints, a distance between the first pair of waypoints and the rate of travel of the user. The at least one memory and the computer program code are configured to, with the processor, cause a navigation system of this example embodiment to also determine one or more points of interest by identifying one or more points of interest within the opportunity space. The opportunity space may have a diagonal with a length that it is based on the distance between the first pair of waypoints. The opportunity space of this example embodiment is at least partially bounded by a side that is oriented relative to the diagonal at an angle that is at least partially based upon the rate of travel of the user.

The at least one memory and the computer program code are further configured to, with the processor, cause the navigation system of an example embodiment to receive input modifying the time to be expended by the user between a first pair of waypoints. In this example embodiment, the at least one memory and the computer program code are configured to, with the processor, cause the navigation system to determine a time to be expended by the user between respective pairs of the waypoints by defining the time to be expended by the user between a second pair of waypoints based upon a predefined time delay between the second pair of waypoints. The at least one memory and the computer program code are further configured to, with the processor, cause the navigation system of this example embodiment to redefine the time to be expended by the user between one or more pairs of the waypoints based on the time, following modification, to be expended by the user between the first pair of waypoints. The at least one memory and the computer program code are configured to, with the processor, cause the navigation system of this example embodiment to redefine the time to be expended by the user between one or more pairs of the waypoints without modifying the time to be expended by the user between the second pair of waypoints.

In another example embodiment, a method for providing navigational assistance at a venue is provided that includes obtaining information regarding the venue to be navigated by a user including a plurality of waypoints at the venue, and determining a time to be expended by the user between respective pairs of the waypoints at the venue. Based on the time and a rate of travel of the user, the method includes determining one or more points of interest that are accessible by the user between at least one pair of the waypoints, and causing presentation of a representation of the venue including the plurality of waypoints and the one or more points of interest that are accessible by the user between the at least one pair of the waypoints. In an example embodiment, the method also includes determining a permissible dwell time at a respective point of interest based on the time, the rate of travel of the user and a distance to the respective point of interest.

The method of an example embodiment determines one or more points of interest by defining an opportunity space between a first pair of waypoints based on the time to be expended between the first pair of waypoints, a distance between the first pair of waypoints and the rate of travel of the user. The method of this example embodiment also identifies one or more points of interest within the opportunity space. In this regard, the opportunity space may have a diagonal with a length that is based on the distance between the first pair of waypoints. The opportunity space of this example embodiment is partially bounded by a side that is oriented relative to the diagonal at an angle that is at least partially based upon the rate of travel of the user.

The method of an example embodiment also includes receiving input modifying the time to be expended by the user between the first pair of waypoints. In this example embodiment, the method may determine the time to be expended by the user between respective pairs of the waypoints by defining time to be expended by the user between a second pair of waypoints based upon a predefined time delay between the second pair of waypoints. The method of this example embodiment may also include redefining the time to be expended by the user between one or more pairs of the waypoints based upon the time, following modification, to be expended by the user between the first pair of waypoints, but without modifying the time to be expended by the user between the second pair of waypoints.

In yet another example embodiment, a computer program product is provided that is configured to provide navigational assistance at a venue. The computer program product includes at least one non-transitory computer-readable storage medium having computer-executable program code portions stored therein with the computer-executable program code portions including program code instructions configured to obtain information regarding the venue to be navigated by a user including a plurality of waypoints at the venue. The computer-executable program code portions also include program code instructions configured to determine a time to be expended by the user between the respective pairs of the waypoints at the venue. Based on the time and a rate of travel of the user, the computer-executable program code portions also include program code instructions configured to determine one or more points of interest that are accessible by the user between at least one pair of the waypoints and program code instructions configured to cause presentation of a representation of the venue including the plurality of waypoints and the one or more points of interest that are accessible by the user between the at least one pair of the waypoints. The computer-executable program code portions of an example embodiment also include program code instructions configured to determine a permissible dwell time at a respective point of interest based on the time, the rate of travel of the user and a distance to the respective point of interest.

In an example embodiment, the program code instructions configured to determine one or more points of interest include program code instructions configured to define an opportunity space between a first pair of waypoints based on the time to be expended between the first pair of waypoints, a distance between the first pair of waypoints and the rate of travel of the user and program code instructions configured to identify one or more points of interest within the opportunity space. In this example embodiment, the opportunity space has a diagonal with a length that is based on the distance between the first pair of waypoints. The opportunity space of this example embodiment is partially bounded by a side that is oriented relative to the diagonal at an angle that is at least partially based upon the rate of travel of the user.

The computer-executable program code portions of an example embodiment also include program code instructions configured to receive input modifying the time to be expended by the user between a first pair of waypoints. In this example embodiment, the computer-executable program code portions also include program code instructions configured to redefine the time to be expended by the user between one or more pairs of the waypoints based upon the time, following modification, to be expended by the user between the first pair of waypoints. In this example embodiment, the program code and instructions are configured to redefine the time to be expended by the user between one or more pairs of the waypoints without modifying the time to be expended by the user between a second pair of waypoints for which the time to be expended by the user is based upon a predefined time delay.

In yet another example of an embodiment, an apparatus for providing navigational assistance at a venue is provided that includes means for obtaining information regarding the venue to be navigated by a user including a plurality of waypoints at the venue and means for determining a time to be expended by the user between respective pairs of the waypoints of the venue. The apparatus of this example embodiment also include means for determining, based on the time and a rate of travel of the user, one or more points of interest that are accessible by the user between at least one pair of the waypoints. The apparatus of this example embodiment further includes means for causing presentation of a representation of the venue including the plurality of waypoints and the one or more points of interest that are accessible by the user between the at least one pair of the waypoints.

BRIEF DESCRIPTION OF THE DRAWINGS

Figure 1:
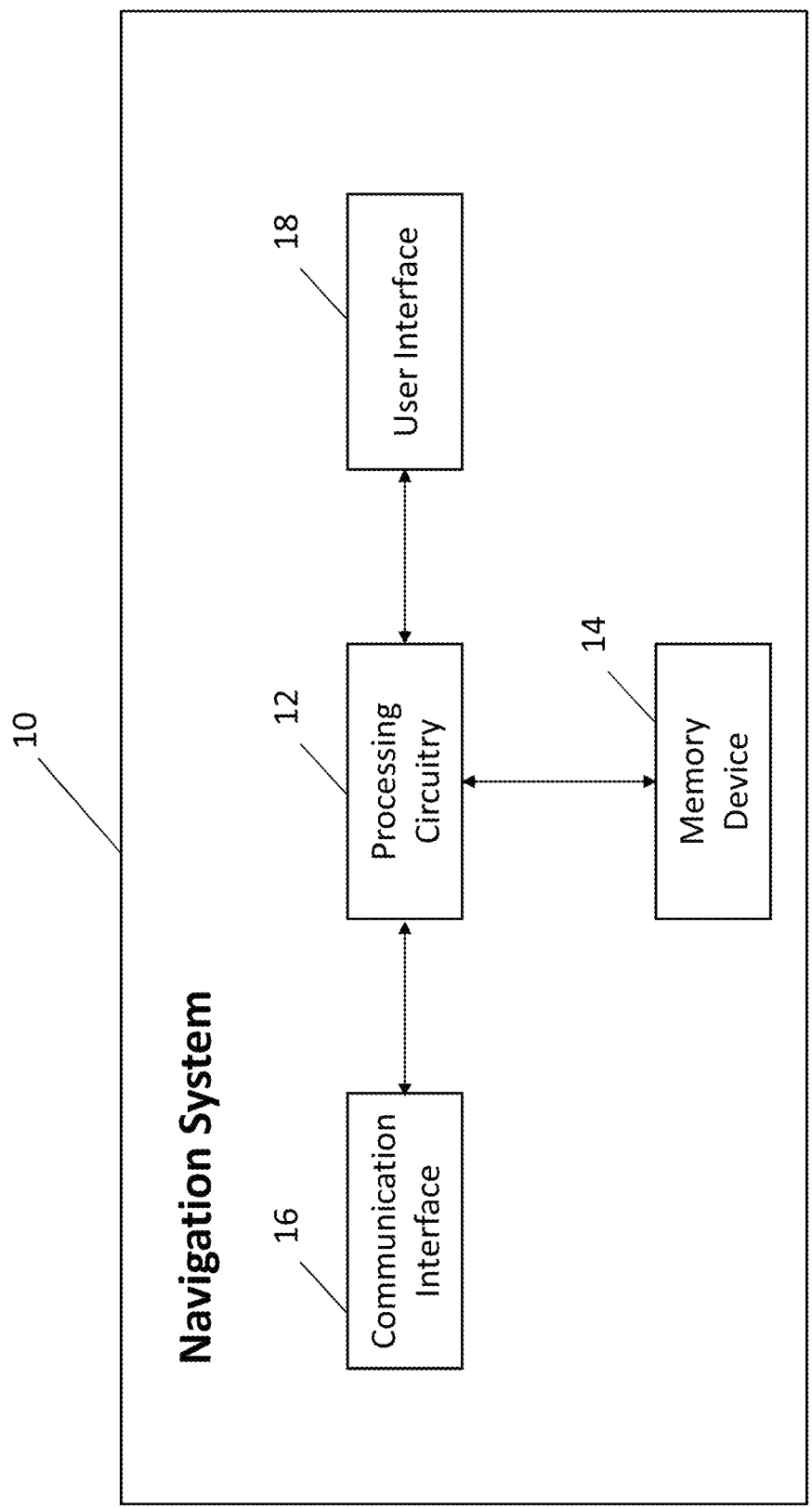
Figure 2:
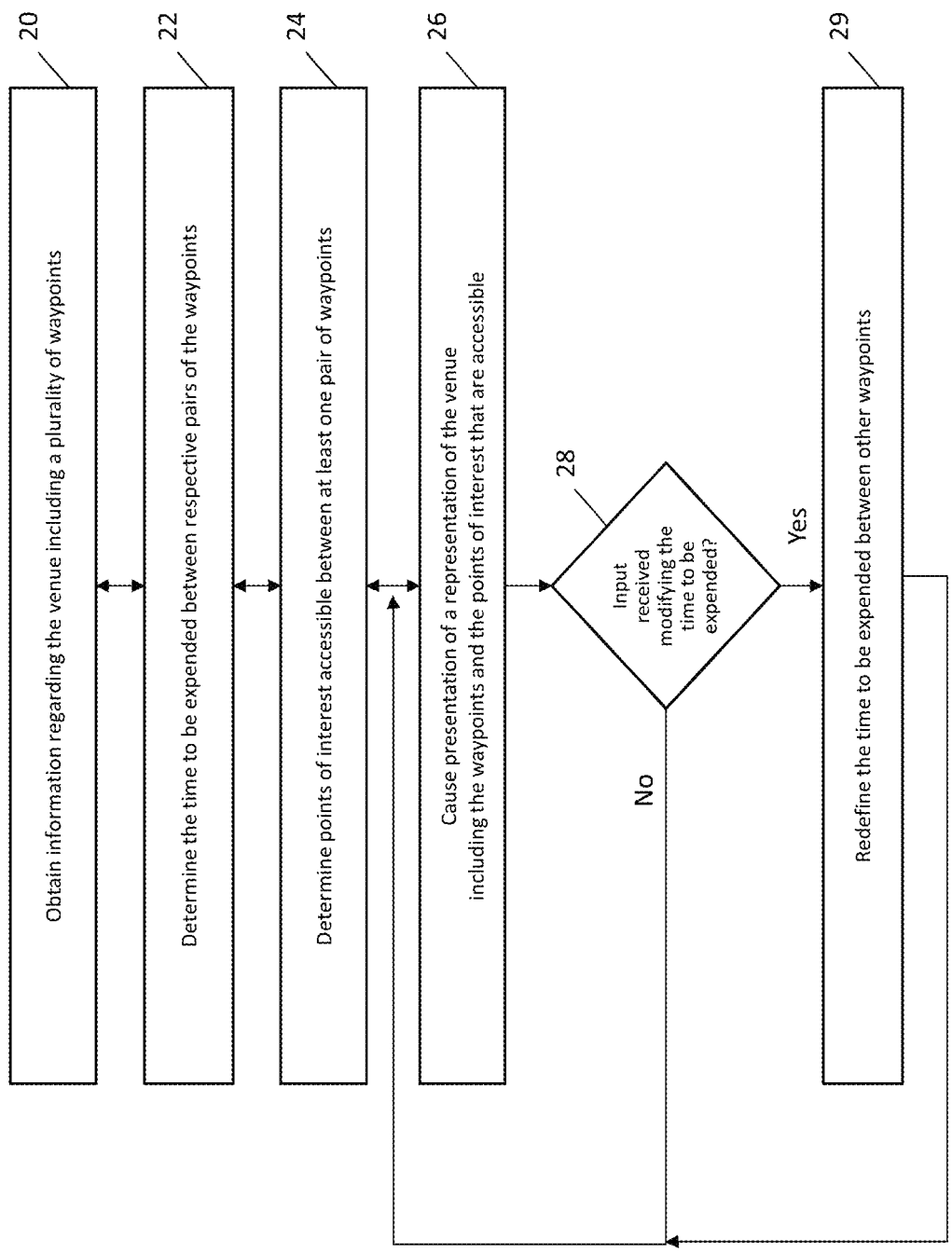
Figure 3:
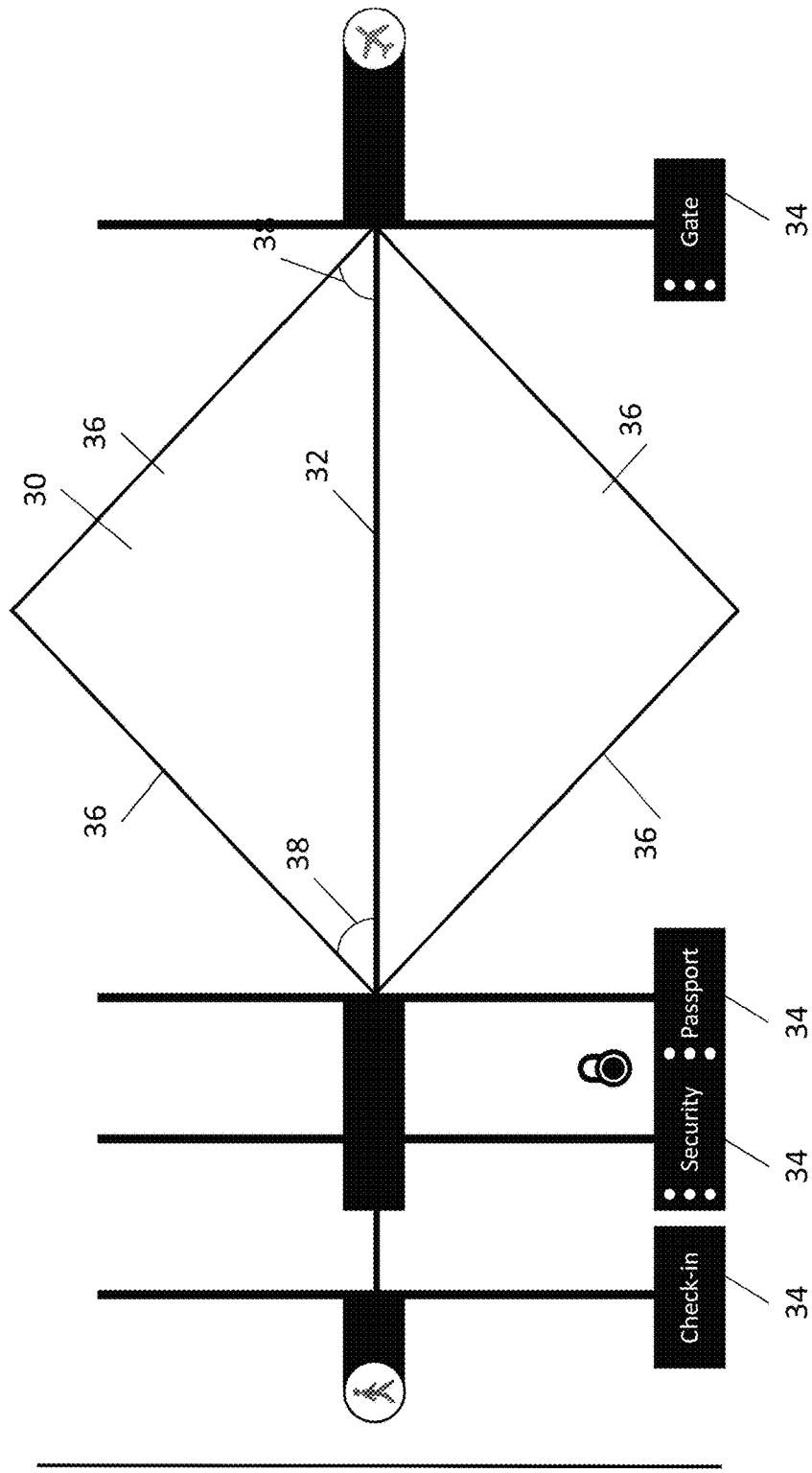
Figure 3:
Figure 4:
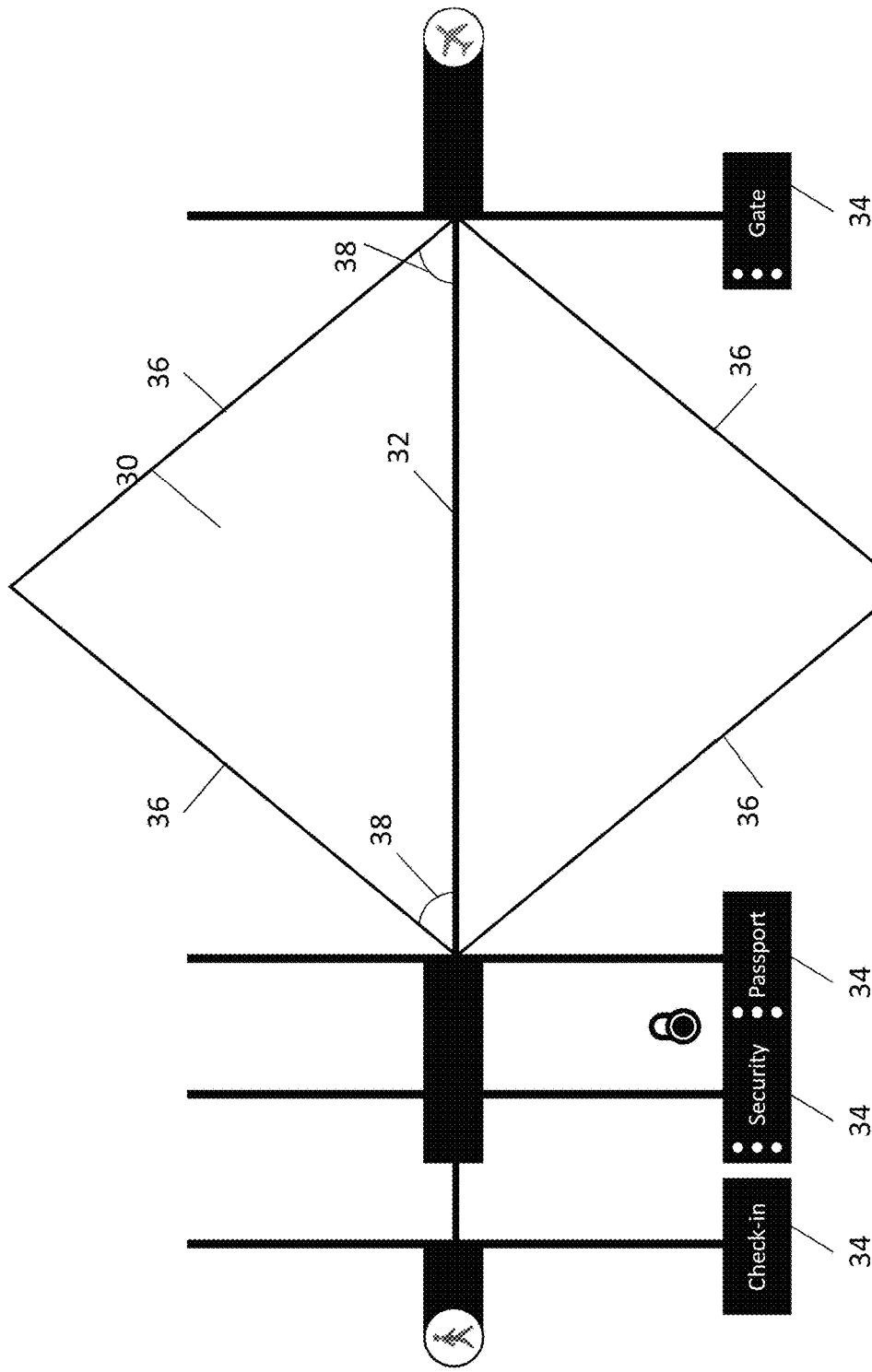
Figure 4:
Figure 5:
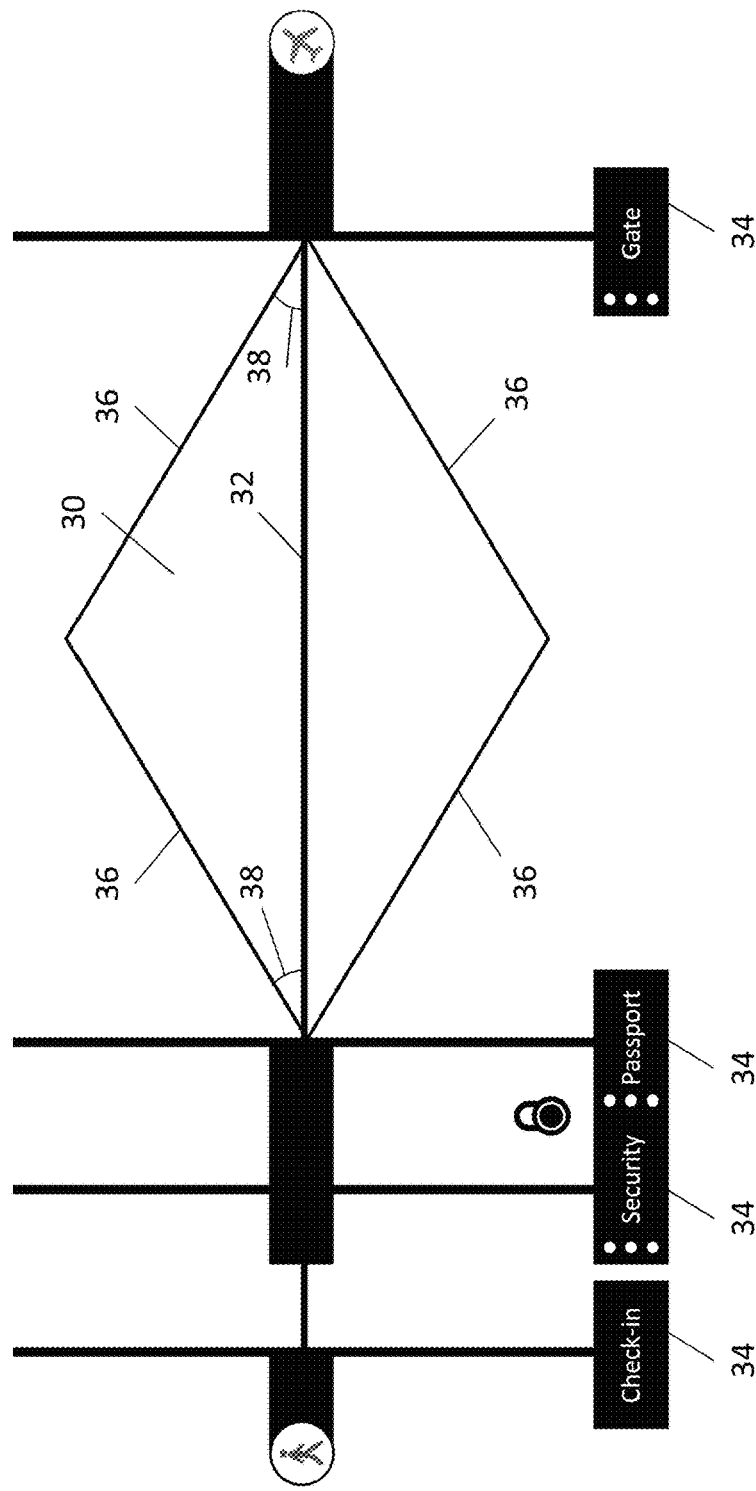
Figure 6:
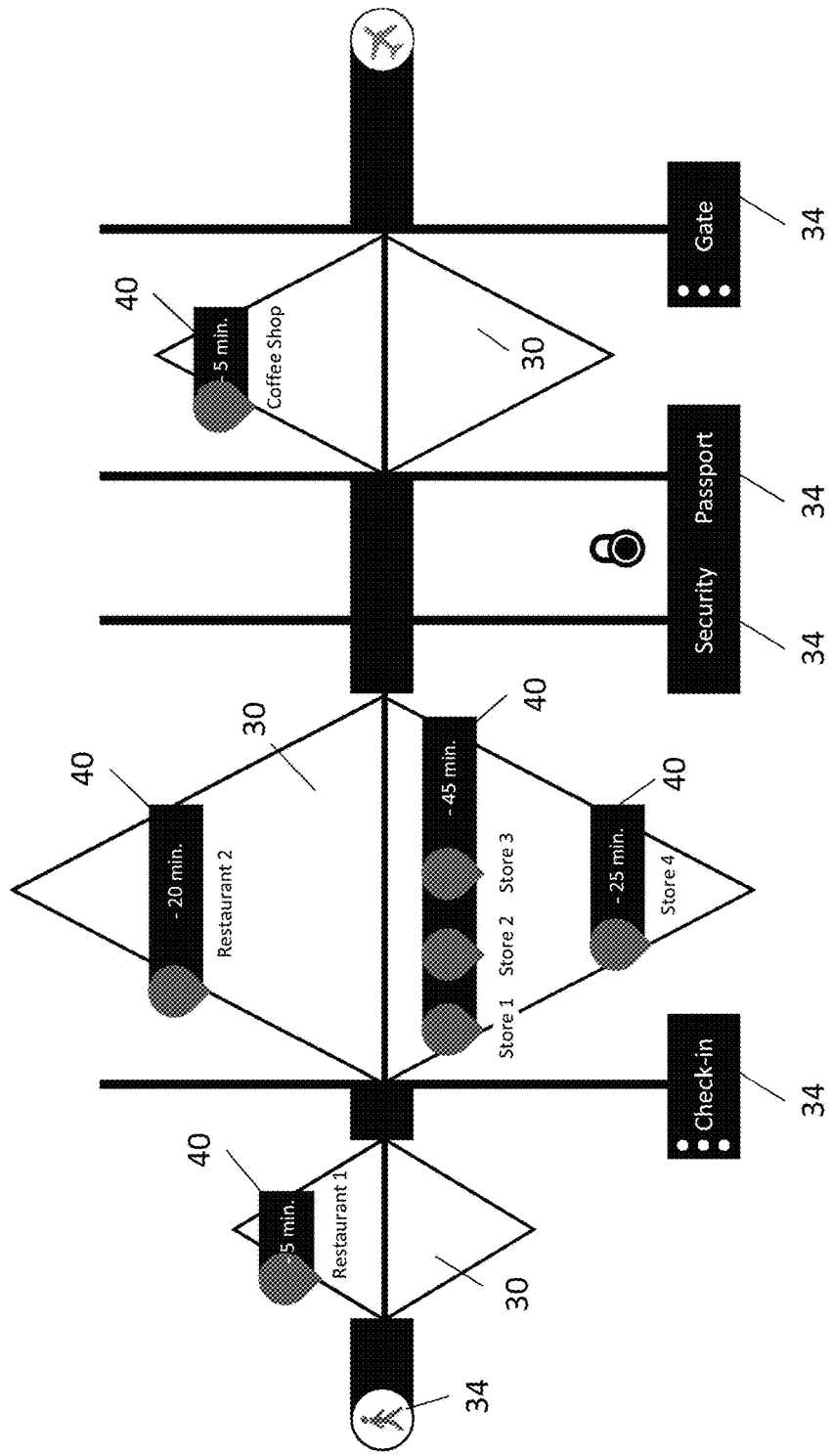
Figure 6:
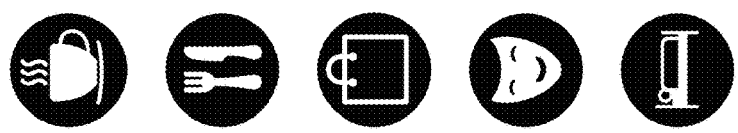
Figure 7:
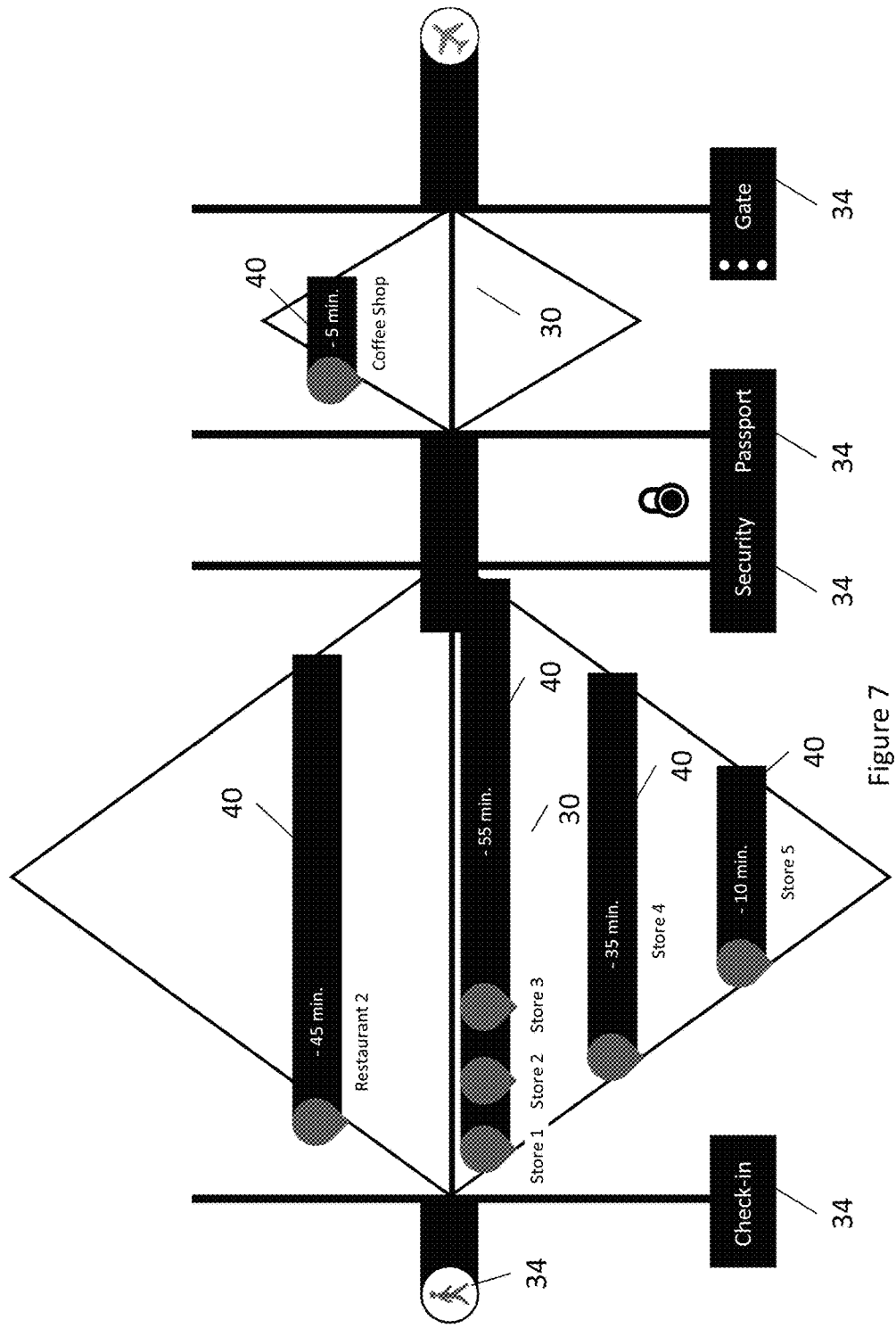
Figure 7:
Figure 8:
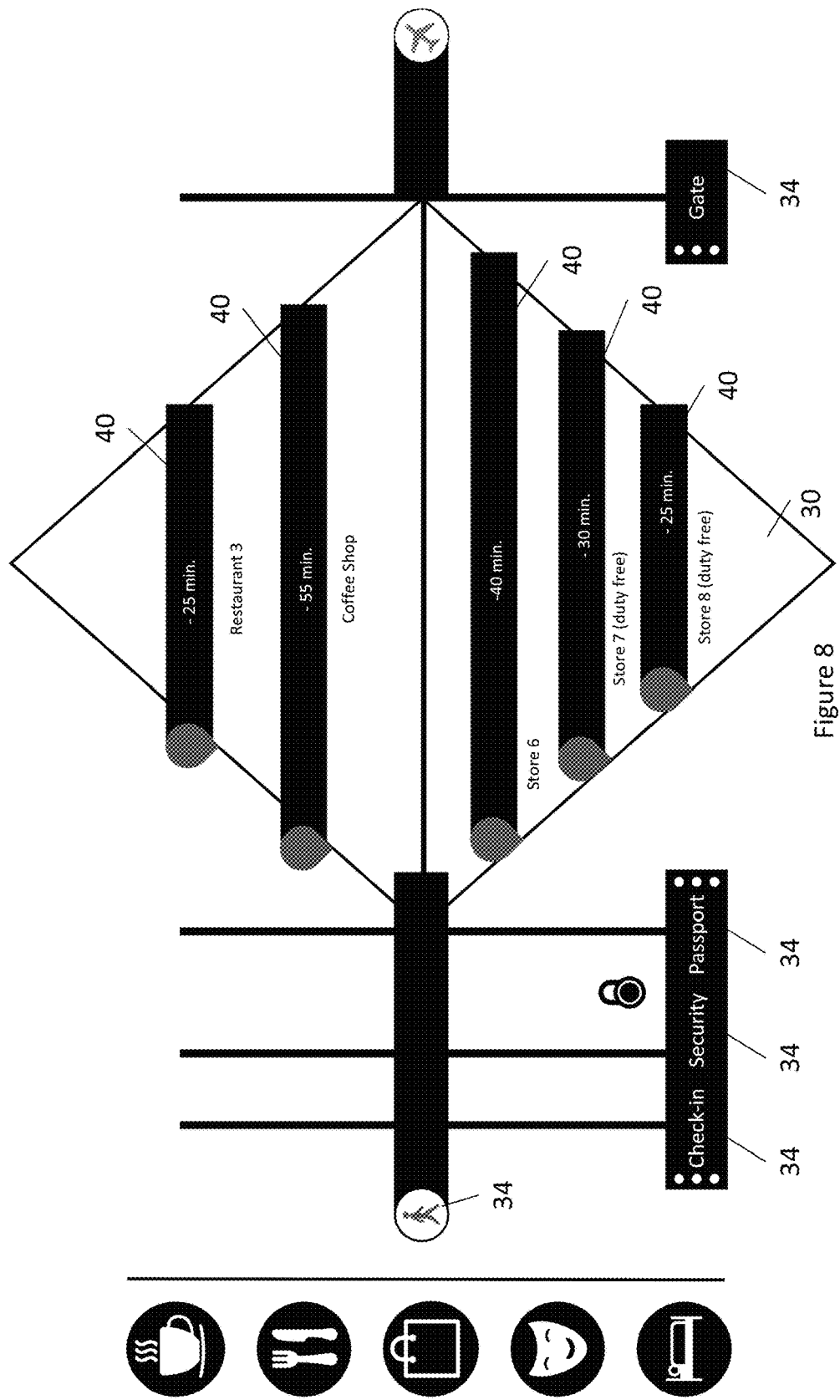

Having thus described example embodiments of the invention in general terms, reference will now be made to the accompanying drawings, which are not necessarily drawn to scale, and wherein:

FIG. 1 is a block diagram of a navigation system specifically configured in accordance with an example embodiment of the present disclosure;

FIG. 2 is a flow chart illustrating the operations performed, such as by the navigation system of FIG. 1, in accordance with an example embodiment of the present disclosure;

FIG. 3 is a representation of a venue including a plurality of waypoints and an opportunity space defined between a pair of waypoints in accordance with an example embodiment of the present disclosure;

FIG. 4 is another representation of the venue of FIG. 3 in which the opportunity space is enlarged as a result of an increased rate of travel of the user in accordance with an example embodiment of the present disclosure;

FIG. 5 is another representation of the venue of FIG. 3 in which the opportunity space is reduced as a result of a decreased rate of travel of the user in accordance with an example embodiment of the present disclosure;

FIG. 6 is a representation of a venue including a plurality of waypoints and defining a plurality of opportunity spaces between different pairs of the waypoints in accordance with an example embodiment of the present disclosure;

FIG. 7 is a representation of the venue of FIG. 6 in which the time to be expended between the different pairs of waypoints has been redefined and the opportunity space between at least one pair of waypoints has been re-sized in accordance with an example embodiment to the present disclosure; and FIG. 8 is another representation of the venue of FIG. 6 in which the time to be expended between the different pairs of waypoints has been redefined and the opportunity space between at least one pair of waypoints has been re-sized in accordance with an example embodiment to the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A navigation system, method and computer program product are provided in accordance with an example embodiment in order to provide navigational assistance at a venue. The navigation system, method and computer program product are described and depicted herein in conjunction with the provision of navigation assistance at an airport. However, the navigation system, method and computer program product may be provided in conjunction with a variety of other venues, such as train stations, ports, amusement parks, sporting events, concert venues, museums, exhibits or the like. Regardless of the type of venue, the venue includes a plurality of waypoints, that is, physical points or regions that a user must visit or pass through. In relation to an airport, the plurality of waypoints may include one or more of a transportation center, e.g., a rental car center, a shuttle bus stop, a train station or the like, via which traveler arrives at the airport; a check-in counter at which a traveler checks their luggage and, in some instances, receives their boarding pass and luggage claim check; a security screening checkpoint and, with respect to international travel, a passport control checkpoint. Further, the waypoints at an airport also include the gate at which the traveler's flight will arrive or depart. At least some of these waypoints, such as the security checkpoint, the gate and, in the case of international travel, passport control, may be mandatory for the traveler to pass through.

The venue also includes a number of points of interest (POIs). These POIs may be located between the various waypoints. With respect in an airport, POIs may be located between the transportation center and the check-in counter, between the check-in counter and the security checkpoint or between the security checkpoint and/or passport control and the gate. Venues may include a wide variety of POIs. These points of interest may include entertainment options, such as playgrounds for children, musical performances or the like; restaurants or other eating establishments; stores or kiosks at which various products are sold; coffee shops; service options, such as a currency exchange, medical services, information services, lodging or the like. Regardless of the type of venue, the navigation system, method and computer program product of an example embodiment provide navigational assistance to permit a user to reach their intended destination in an efficient and timely manner, while also being informed of the various POIs that can be visited by the user while taking into account the context experienced by the user at the venue.

The navigation system may be embodied in a variety of different computing devices that are specifically configured in accordance with an example embodiment. For example, a navigation system may be embodied by a mobile computing device carried by the user through the venue, such as a smart phone or other mobile telephone, a tablet computer, a laptop computer, a personal navigation device, a mapping system or the like. Still further, the navigation system may be embodied by a computing device, such as a server or other network device, that provides navigational assistance to one or more users at the venue, such as by providing information as described herein to the user via a respective mobile computing devices carried by the users through the venue. Regardless of the manner in which the navigation system is embodied, the navigation system 10 of an example embodiment includes an apparatus as shown in FIG. 1 which, in turn, includes, is associated with or is otherwise in communication with processing circuitry 12, a memory device 14, a communication interface 16 and optionally a user interface 18.

In some embodiments of the processing circuitry 12, the processing circuitry may be in communication with the memory device 14 via a bus for passing information among components of the navigation system 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the navigation system to carry out various functions in accordance with an example embodiment. For example, the memory device could be configured to buffer input data for processing by the processing circuitry. Additionally or alternatively, the memory device could be configured to store instructions for execution by the processing circuitry.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, the computing device) configured to employ an embodiment by further configuration of the processor by instructions for performing the algorithms and/or operations described herein. The processing circuitry may include, among other things, a clock, an arithmetic logic unit (ALU) and logic gates configured to support operation of the processor.

The navigation system 10 of an example embodiment also includes a communication interface 16. The communication interface may be any means such as a device or circuitry embodied in either hardware or a combination of hardware and software that is configured to receive and/or transmit data from/to other electronic devices in communication with the navigation system. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s).

The navigation system 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry may be configured to control one or more functions of one or more user interface elements through computer program instructions (for example, software and/or firmware) stored on a memory accessible to the processing circuitry (for example, memory device 14, and/or the like).

Referring now to FIG. 2, operations are depicted that are performed, such as by the navigation system 10 of FIG. 1, in accordance with an example embodiment in order to provide navigational assistance at a venue. As shown in block 20, the navigation system includes means, such as the processing circuitry 12, the memory device 14, the communication interface 16 or the like, for obtaining information regarding the venue to be navigated by user. In this regard, the venue may be identified in various manners. For example, the navigation system, such as the processing circuitry, may receive an indication provided by the user that identifies both the user and the venue of interest. Alternatively, the venue may be identified based upon the location of the user as represented by the location of a mobile computing device associated with the user. Still further, the venue may be identified based upon a schedule associated with the user, such as maintained by a mobile computing device associated with the user, with the venue identified by a calendar entry within the schedule that is associated with the current time or an upcoming time period.

Regardless of the manner in which the venue is identified, the information that is obtained regarding the venue may be obtained from information associated with the venue that is stored by the memory device 14 or by another database with which the navigation system 10 is in communication. The information may include an identification of a plurality of waypoints at the venue. As described above, the waypoints may vary depending upon the type of venue with an airport including, for example, a transportation center, a check-in counter, a security checkpoint, passport control and the gate. The information that is obtained regarding the venue may also include information regarding POIs at the venue. As also described above, the POIs may vary depending upon the type of venue and may include, for an airport, restaurants, coffee shops, stores, service offerings, entertainment options, lodging or the like. The information associated with the waypoints and the POIs not only identify the waypoints and the POIs, but also identify the locations of the waypoints and the POIs at the venue. Other types of information regarding the venue may also be obtained with the additional information also being dependent upon the type of venue. For example, information regarding the current wait times associated with one or more of the waypoints at the venue may be obtained. With respect to an airport, for example, information regarding the wait times at the check-in counter, the security checkpoint and passport control may be obtained. At least some of this additional information may be dynamic in that the additional information changes over the course of time, such as the wait times increase or decrease.

In addition to the information that is obtained regarding the venue, the navigation system 10 of an example embodiment includes means, such as the processing circuitry 12, the communications interface 16 or the like, for obtaining information regarding the user. This information may include not only the identity of the user but, in some embodiments, additional information that may be useful, at least in conjunction with certain types of venues. With respect to an airport, for example, information regarding the flight to be taken by the user may be obtained. Based upon the flight information, the navigation system, such as the processing circuitry, is also configured to determine the time at which the flight departs or disembarks and, as a result, the time by which the user should be at the gate, as well as the identification and location of the gate itself.

As shown in block 22 of FIG. 2, the navigation system 10 includes means, such as the processing circuitry 12 or the like, configured to determine the time to be expended by the user between respective pairs of the waypoints at the venue. In this regard, the waypoints are generally arranged in a sequential manner and the time to be expended by the user between neighboring waypoints is determined. The navigation system, such as the processing circuitry, may be configured to determine the time to be expended by the user between respective pairs of the waypoints in different manners. For example, the time to be expended by the user between a respective pair of waypoints may be determined based upon a predetermined time that is stored, for example, by the memory device 14. Alternatively, the time to be expended by the user between a respective pair of waypoints may be determined based upon a historical average of the time taken by a plurality of users to walk or otherwise travel between the respective pair of waypoints. While the foregoing example is based upon the historical average time for a plurality of users, the time to be expended by the user between a respective pair of waypoints may, instead, be determined based upon a historical average of the time required for the respective user to travel between the respective pair of waypoints, such as in instances in which the user has previously traversed the route between the pair of waypoints.

Still further, the time to be expended by the user between a respective pair of waypoints may be determined based upon the distance between the pair of waypoints, such as may be stored by the memory device 14. In this regard, the navigation system 10, such as the processing circuitry 12, may be configured to determine the time to be expended by the user between the respective pair of waypoints based upon the product of the distance between the respective pair of waypoints and the rate of travel of the user. The rate of travel of the user may be based upon a historical average of the rate of travel of a plurality of users between the respective pair of waypoints, the historical average of the rate of travel of the respective user between the respective pair of waypoints. Alternatively, the rate of travel may be based upon current or recent information, such as information obtained regarding the venue that includes information, e.g., crowdsourced information, regarding the current average rate of travel of users between different waypoints at the venue. Still further, the rate of travel may be determined based upon the current or actual rate of travel of the respective user, such as may be determined by position sensors or other types of sensors onboard a mobile computing device carried by the user through the venue.

Still further, the time to be expended by the user between a respective pair of waypoints may also be determined by the navigation system 10, such as the processing circuitry 12, based upon a predefined time delay between the respective pair of waypoints. This predefined time delay may be predetermined and stored, for example, by the memory device 14. Alternatively, the predefined time delay may be included in the information regarding the venue that is obtained and may be based, for example, upon current or recent information regarding a predefined time delay between the respective pair of waypoints. For example, the time delay between a security checkpoint and passport control may be predefined and the user may be unable to modify the predefined time delay between the respective pair of waypoints, as represented by the padlock icon between the security checkpoint and passport control of FIGS. 3-8.

As shown in block 24 of FIG. 2, the navigation system 10 also includes means, such as the processing circuitry 12 or the like, for determining, based on the time to be expended between a respective pair of waypoints and the rate of travel of the user, one or more POIs that are accessible by the user between at least the respective pair of waypoints. The rate of travel of the user may be defined in any of the manners described above including those based upon historical rates of travel of either a plurality of users or the respective user or those based upon current or recent information regarding the average rate of travel of a plurality of users or the respective user. In either instance, the navigation system, such as the processing circuitry, of an example embodiment defines an opportunity space between the respective pair of waypoints based on the time to be expended between the respective pair of waypoints, the distance between the respective pair of waypoints, such as the shortest distance between the respective pair of waypoints, and the rate of travel of the user. In this regard, the distance between the respective pair of waypoints may be predetermined and may be obtained by the navigation system along with other information regarding the venue and/or may be stored by the memory device 14.

With reference to FIG. 3, for example, the opportunity space 30 may be defined as a rectangular space, such as a rhombus. In the example embodiment, the opportunity space defines a diagonal 32 that extends between, such as directly between, the respective pair of waypoints 34 and has a length that is based upon, such as equal to, the distance between the respective pair of waypoints. The opportunity space is also bounded by sides 36 that are oriented relative to the diagonal at an angle 38 that is at least partially based upon and, in some embodiments, entirely based upon the rate of travel of the user. Thus, as the rate of travel of the user increases such that the user may venture further from the diagonal defining the direct path between the respective pair of waypoints in the same amount of time, the angle defined by the sides relative to the diagonal increases, such as shown in FIG. 4. Conversely, as the rate of travel of the user decreases, such as due to the venue being crowded, construction or other impediments at the venue or other factors, such that the user cannot venture as far from the diagonal defining the direct path between the respective pair of waypoints in the same amount of time, the angle defined by the sides relative to the diagonal becomes smaller as shown in FIG. 5. Thus, the angle defined between the sides of the opportunity space and the diagonal of the opportunity space and correspondingly the magnitude of the slope of the sides of the opportunity space varies directly and, in one embodiment, proportionally to the rate of travel of the user. While historical and/or average measures may be utilized for the rate of travel of the user, use of the current actual rate of travel of the user can increase the accuracy with which the opportunity space is defined.

In this example embodiment, the navigation system 10 includes means, such as the processing circuitry 12 or the like, for identifying one or more POIs within the opportunity space 30. In this regard, the POIs for the venue may have been obtained and stored, for example, by the memory device 14 along with respective locations of the POIs. Although the POIs may be defined and stored in various manners, the navigation system of an example embodiment includes, is associated with or is otherwise in communication with a mapping database that includes, among other information, information regarding the POIs. In this regard, the mapping database may be a master geographic or navigation database that contains data that represent geographic features in a coverage area. The coverage area may correspond to an entire country, such as the United States. Alternatively, the coverage area may correspond to several countries. According to another alternative, the coverage area may represent only a single region within a geographic area, such as a country, state, province, or city.

In one embodiment, the mapping database includes data used for navigation-related services. For example, the geographic database includes road segment data records, node data records, and cartographic ("carto") data records. Other data records such as, but not limited to, routing data, maneuver data, and point of interest data may also be included.

The road segment data records are links or segments representing roads, streets, or paths. The node data records are end points corresponding to the respective links or segments of the road segment data records. The road segment data records and the node data records represent a road network, such as used by vehicles, cars, and/or other entities. Alternatively, the mapping database contains path segment and node data records or other data that represent pedestrian paths in addition to or instead of the vehicle road record data.

The road segments and nodes may be associated with attributes, such as geographic coordinates, street names, address ranges, speed limits, turn restrictions at intersections, and other navigation related attributes, as well as points of interest, such as gasoline stations, hotels, restaurants, museums, stadiums, offices, automobile dealerships, auto repair shops, buildings, stores, etc. The mapping database may include data about the locations of these points of interest. The mapping database may also include data about places, such as cities, towns, or other communities, and other geographic features, such as bodies of water, mountain ranges, etc. Such place or feature data may be point of interest data or may be associated with points of interest or point of interest data (such as a data point used for displaying or representing a position of a city). The mapping database may include other kinds of information.

The carto data records contain geographic feature information that is used to display image representations (such as maps) of various portions of a geographic region represented by the mapping database. The carto data records are links or segments or polygons that represent geographic features other than roads or paths. For example, the links or link segment data records may represent a country boundary or border, a state boundary or border, a province boundary or border, a county boundary or border, a city or township boundary or border, a river, a lake, a landmark, and/or other geographic features, such as the definition of parcels of land and the footprints of buildings. The carto data records may be associated with position or location information, such as geographic coordinates (e.g., latitude, longitude, and/or altitude) as well as with point of interest data or other data.

The mapping database may be stored in a format that facilitates updating, maintenance, and development. For example, the mapping database or data in the mapping database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems. For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

The mapping database of an example embodiment may include a plurality of layers. For example, the mapping database may include a map layer that includes information, such as the road segment data records and the node data records, regarding the links and nodes along the roads as well as the points of interest defined along the links. Further, the mapping database may include one or more cartographic layers that include the information, such as the cartographic data records, defining the boundaries and center points of the parcels of land and the building footprints on the respective parcels of land. In this regard, the information regarding the building footprints may be image-based representations of the building footprints that may be utilized to provide context for a user viewing a map, but lack spatial intelligence and, as a result, cannot be utilized for comparative purposes with respect to the location of a user device. Typically, the map layer is utilized during the generation of a route, while the information regarding the parcels of land and building footprints are utilized, not for purposes of determining routes, but for display purposes so as to provide additional context to a user. In this example embodiment, the mapping database may also include a data layer that provides location awareness and spatial intelligence, such as by associating the representation of the layers to geographic coordinates.

While all POIs may be identified, such as from a mapping database or otherwise, the navigation system, such as the processing circuitry, of an example embodiment identifies those points of interest that are determined to be most relevant to the user, at least for initial display subject to a request by the user for the display of additional POIs of lesser relevance. The relevancy of the POIs to the user may be defined in various manners. In one example embodiment, the relevancy of the POIs to the user may be based upon the historical experience of the user at the venue with those POIs that the user visited or those types of POIs that the user visited in the past being considered most relevant, while other POIs or other types of POIs that were not previously visited by the user being considered of lesser relevance. In an instance in which the user has not been to the venue previously, the relevancy of the POIs may be based upon other historical information associated with the behavior of the user at other venues, such as other venues of the same type or other venues in general. Thus, the POIs or the types of POIs that are most frequently visited by the user at other venues may be identified as having greater relevance than the POIs or the types of POIs that have not been visited or have not been visited as frequently by the user at other venues. The relevancy of the points of interest may be identified in other manners. For example, the loyalty programs or reward programs in which the user participates may be identified, such as in the information regarding the user that is initially obtained and stored, for example, by the memory device 14. Thus, the POIs or the types of POIs for which the user is a member of the loyalty program or rewards program may be determined by the processing circuitry 12 to have greater relevance than other POIs for which the user is not a member of the loyalty program or rewards program.

Additionally, in instances in which the venue is an airport, the information obtained regarding the user (such as from the user or the airline to be utilized by the user) may identify whether the user is a frequent flyer of a respective airline and has a sufficient traveler status to visit the business center or other lounge associated with the respective airline. In an instance in which the user is identified to have authorization to visit the business center or lounge associated with a respective airline, a POI associated with the business center or club may also be identified to have sufficient relevancy to be displayed.

As shown in block 26 of FIG. 2, the navigation system 10 also includes means, such as the processing circuitry 12, the user interface 18 or the like, for causing presentation of a representation of the venue including the plurality of waypoints and the one or more POIs that are accessible by the user between the at least one pair of the waypoints. With reference to FIG. 6, for example, the representation of an airport is provided with a plurality of waypoints 34. Opportunity spaces 30 have been defined between the transportation center (as represented by the icon of a person in a circle) and the check-in waypoint, between the check-in waypoint and the security checkpoint and between passport control and the gate. As a result of the different lengths of time that the user is expected to expend between the respective pairs of waypoints, the opportunity spaces are differently sized. For example, the user is expected to expend a longer period of time between the check-in waypoint and the security checkpoint than between the transportation center and the check-in waypoint and also between passport control and the gate. Thus, the opportunity space between the check-in waypoint and the security checkpoint is larger than the other opportunity spaces. Further, the user is anticipated to expend more time between passport control and the gate than between the transportation center and the check-in waypoint such that the opportunity space between passport control and the gate, while smaller than the opportunity space between the check-in waypoint and the security checkpoint, is larger than the opportunity space between the transportation center and the check-in waypoint. While a representation of the entire venue may be presented as shown in FIGS. 3-8, a representation of only a portion of the entire venue may be presented in other embodiments, such as in instances in which the size and/or other attributes of the display upon which the representation of the venue will be presented limit the extent of the venue to be presented. For example, a smart watch may be configured to present a representation of a portion of the venue with the user capable of scrolling or otherwise changing the portion of the venue that is presented.

As shown in FIG. 6, one or more POIs are identified within the opportunity space. The POIs may be identified by name. In some embodiments, the different types of POIs, such as POIs associated with coffee shops, restaurants, shopping, entertainment and lodging may be separately identified, such as by being depicted in different colors.

In an example embodiment, the navigation system 10 also includes means, such as the processing circuitry 12 or the like, for determining a permissible dwell time at a respective POI based upon the time to be expended between a respective pair of waypoints, the rate of travel of the user and a distance to the respective POI, that is, the distance to the respective POI from the path that extends directly between the respective pair of waypoints between which the POI is located as represented by the diagonal 32 of the opportunity space 30. The permissible dwell time is the maximum length of time that the user can expend at the POI while still arriving at their destination, e.g., the gate, in a timely manner. With respect to an opportunity space and the POIs identified therewithin, the POIs are depicted so as to be offset from the diagonal defined by the opportunity space by a distance that corresponds to the distance to the POI from the path extending directly between the respective pair of waypoints. Thus, the POIs that are located further from the path that extends directly between the respective pair of waypoints will be depicted so as to be spaced further from the diagonal defined by the opportunity space than POIs that are closer to the path that extends directly between the respective pair of waypoints.

In the illustrated embodiment, a POI may be depicted within the opportunity space 30 at a location along a side 36 of the opportunity space that extends outwardly from the initial waypoint of the pair of waypoints 34 at a distance from the diagonal 32 defined by the opportunity space that corresponds to the distance of the POI from the path that extends directly between the respective pair of waypoints. In this example embodiment and as shown in FIG. 6, the permissible dwell time that a user may remain at a POI is the length of time represented by a timeline 40 that extends through the opportunity space parallel to the diagonal defined by the opportunity space. As shown in FIG. 6, an indication of the length of time, e.g., 25 minutes, may be provided on or in association with the timeline in order to provide additional information to the user. Thus, the navigation system 10, such as the processing circuitry 12, may be configured to determine the permissible dwell time by determining the difference between the time to be expended by the user between a respective pair of waypoints and the sum of the time expended by the user to travel to the POI and to return from the POI as represented by the sides 34 of the opportunity space that lie on the same side of the diagonal of the opportunity space with one side diverging from the initial waypoint of the respective pair of waypoints and the other side converging to the subsequent waypoint of the respective pair of waypoints. In instances in which multiple POIs are co-located, each of the co-located POIs may be identified along the same timeline, such as shown by stores 1, 2 and 3 in the embodiment of FIG. 6.

In an example embodiment, the navigation system 10 also includes means, such as the processing circuitry 12, the user interface 18 or the like, for receiving input modifying the time to be expended by the user between a first pair of waypoints. See block 28 of FIG. 2. In one example embodiment, the input is provided by a user who modifies the time to be expended between the first pair of waypoints. With respect to the presentation of a representation of the venue such as shown in FIG. 6, the user input may be provided by dragging the vertical line associated with a respective waypoint 34 to the left or to the right, thereby modifying the time to be expended between the respective pairs of waypoints that include the waypoint that has been adjusted by the user. For example, movement of an intermediate waypoint to the left would result in a reduction in the time expended between an initial pair of waypoints of which the waypoint that has been modified is the second waypoint of the pair, while concurrently resulting in an increase in the time expended between a subsequent pair of waypoints of which the waypoint that has been modified is the first waypoint of the pair.

Additionally or alternatively, the input may be provided by information obtained from the user, such as information regarding the location of the user provided, for example, by a mobile computing device carried by the user. In this example embodiment, information obtained from the user may indicate that the user has already traveled between at least some of the waypoints in an amount of time that differs from the time that was estimated to be expended such that the time to be expended between other pairs of waypoints may be modified to take into account the difference between the actual and estimated times to travel between the initial waypoints. For example, the location of the user may identify that the user has already passed through the check-in waypoint and, as such, has moved from the transportation center to the check-in waypoint either much more quickly than anticipated or may have proceeded directly to the check-in waypoint, such as in an instance in which the user has been dropped off at the airport terminal and avoided the transportation center entirely.

In this example embodiment, the navigation system 10 includes means, such as the processing circuitry 12 or the like, configured to redefine the time to be expended by the user between one or more other pairs of the waypoints based upon the time, following modification, to be expended by the user between the first pair of waypoints. See block 29 of FIG. 2. Thus, in an instance in which the input indicates that the time to be expended between the first pair of waypoints is to be increased relative to the prior estimation, such as by user input moving one or both of the first pair of waypoints in an outward direction or input indicating that the user has progressed between the first pair of waypoints more slowly than estimated, the time to be expended between the other pairs of waypoints may be correspondingly decreased and the opportunity space may be correspondingly decreased since the user will have additional time to travel further from the path that extends directly between the other pairs of waypoints. However, in an instance in which the time to be expended between the first pair of waypoints has decreased, such as by user input moving one or both of the waypoints of the first pair of waypoints toward one another or input indicating that the user has expended less time than anticipated between the first pair of waypoints, the time to be expended between the other pairs of waypoints is correspondingly increased and the size of the opportunity space is correspondingly increased since the user will have more time to travel away from the path that extends directly between the other pairs of waypoints.

In one embodiment, the cumulative time that the time to be expended traveling between the other pairs of waypoints is modified, e.g., increased or decreased, is equal (but of opposite sign) to the amount by which the time expended to travel between the first pair of waypoints changed, e.g., decreased or increased, respectively, relative to the prior estimation. The navigation system 10, such as the processing circuitry 12, may be configured such that the cumulative change in the time to be expended between the respective pairs of waypoints may be apportioned between the pairs of waypoints in a proportional manner based upon the relative times to be expended between the respective pairs of waypoints. As a result of the sequential nature of the waypoints, changes in the time expended within a respective region defined between one pair of waypoints only has impact upon the regions defined between subsequent pairs of waypoints and not any region defined between a prior pair of waypoints through which the user has already passed.

In an embodiment in which the time to be expended between one or more pairs of waypoints, such as a second pair of waypoints, is predetermined, such as based upon a predefined time delay, e.g., the predefined time delay between the security checkpoint and passport control, the increase or decrease in the time to be expended between other pairs of waypoints does not change or redefine the predefined time delay between the second pair of waypoints. By way of example, in an embodiment in which the representation of a venue includes four regions defined between respective pairs of waypoints with a predefined time delay established within a third region between a respective pair of waypoints, the reduction in the time expended in the first region between a first pair of waypoints may be offset by corresponding increases in the time expended between the second and fourth regions (but not the third region for which there is a predefined time delay). The amount of the increase in the time expended within the second and fourth regions is equal in the aggregate to the amount of the decrease in the time expended in the first region with the increase in time expended in the second and fourth regions being proportional to the relative sizes of the second and fourth regions.

By way of example, FIG. 7 depicts a representation of the same venue as shown in FIG. 6. However, in contrast to the representation of the venue of FIG. 6, input has been provided indicating that the user does not expend any time between the transportation center and the check-in counter. As such, the opportunity space 30 defined in the example of FIG. 6 between the transportation center and the check-in counter has been eliminated in the representation of FIG. 7 and the time to be expended between the check-in counter and the security checkpoint has been increased and the corresponding opportunity space therebetween has been enlarged. As a result, the permissible dwell time at the points of interest that were previously identified within the opportunity space are extended in FIG. 7 relative to FIG. 6 as the user has additional time to shop, eat or the like. Additionally, another point of interest has been identified in the opportunity space of FIG. 7 as a result of the enlargement of the opportunity space and the ability of the user to travel further from the path that extends directly between the check-in counter and the security checkpoint while still arriving at the gate in a timely manner.

In some embodiments, the navigation system 10, method and computer program product may be configured to provide information regarding the parking options, such as the available parking areas, parking locations, time required for parking or the like as well as an indication of one or more parking strategies that could be employed to arrive more quickly at the airport terminal so as to increase the time available to the user to explore various points of interest. For example, an indication may be provided that an autonomous valet parking service is available and would allow the user to arrive more quickly at the airport terminal and to increase the time available to the user to explore various points of interest.

As yet another example, FIG. 8 depicts another example of the airport venue shown in FIGS. 6 and 7 in which the user has quickly passed through the waypoints up to and including the passport control such that significant additional time is allotted between passport control and the gate. As such, the permissible dwell time at the POIs previously identified within the opportunity space 30 between passport control and the gate is greatly extended and a number of additional POIs further from the direct path between passport control and the gate are identified as a result of the ability of the user to travel further from the direct path between passport control and the gate while still ensuring their timely arrival at the gate.

By permitting the representation of the venue including the time to be expended between the various pairs of waypoints to be redefined in the manner described above, the navigation system 10, method and computer program product provide technical advantages by conserving processing resources. In this regard, the redefinition of the representation of the venue based upon modified or updated information may be performed in a more computationally efficient manner, thereby conserving processing resources, relative to creation of another or different representation of the venue, that is a new or entirely different representation of the venue, utilizing the modified or updated information.

The navigation system 10, method and computer program product of an example embodiment also provide a wealth of information to a user that provides a number of informative options to the user as to the manner in which they wish to expend their time, while still providing comfort to the user that the user will arrive at their destination in a timely manner. As such, the user and, in some embodiments, the airline, train company or the like avoids the cost and inefficiencies associated with instances in which a user misses their flight, train or the like as a result of the user straying too far way within the venue.

The example embodiments described above included waypoints that were defined in advance and static. In some embodiments, one or more waypoints may not yet be defined or may change. For example, the gate number for a flight may not yet be assigned or may change. In an instance in which a waypoint changes, the navigation system 10, method and computer program product of an example embodiment are configured to adapt to the updated waypoint by repeating the process described above, such as in conjunction with FIG. 2, based upon the updated waypoint so as to again determine the time to be expended by the user between respective pairs of the waypoints including the updated waypoint, determine one or more points of interest that are accessible by the user between at least one pair of the waypoints including the updated waypoint and cause presentation of the representation of the venue including the updated waypoints and the one or more points of interest that are accessible by the user. In an instance in which a waypoint, such as a gate number, is not yet available, the navigation system, method and computer program product of an example embodiment is configured to determine the point(s) of interest that are accessible to the user while still permitting the user to reach any gate that may subsequently be assigned in a timely manner. For example, although the gate number has not yet been assigned, the gate may be known to be located in a particular concourse or hall, such as based upon the airline that will service the user, and the navigation system, method and computer program product of this example embodiment may be configured to determine the point(s) of interest that are accessible to the user while still permitting the user to reach any gate in a particular concourse or hall that may subsequently be assigned in a timely manner.

As described above, FIG. 2 illustrates a flowchart of a navigation system 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of the navigation system and executed by the processing circuitry 10 or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system configured to provide navigational assistance at a venue, the system comprising one or more position sensors and a navigation system, the navigation system comprising at least one processor and at least one memory including computer program code, the at least one memory and the computer program code are configured to, with the processor, cause the navigation system to at least:

obtain information regarding the venue to be navigated by a user including a plurality of waypoints at the venue and a destination arrival time defining a time at which the user is to arrive at a destination;

detect, via the one or more position sensors, a current rate of travel of the user;

determine a time to be expended by the user between respective pairs of the waypoints at the venue based at least on a product of the current rate of travel of the user and a distance between the respective pairs of the waypoints;

define an opportunity space between at least one pair of waypoints based on the destination arrival time, the time to be expended by the user between the at least one pair of waypoints, the distance between the at least one pair of waypoints and the current rate of travel of the user;

based on the time and the rate of travel of the user, determine one or more points of interest that are accessible by the user within the opportunity space;

cause presentation of a representation of a portion of the venue including a representation of boundaries of the opportunity space between the at least one pair of waypoints and the one or more points of interest that are accessible by the user within the opportunity space such that arrival of the user at the destination is able to be achieved by the destination arrival time;

detect, via the one or more position sensors, a change in the current rate of travel of the user;

update the opportunity space between the at least one pair of waypoints based at least on the change in the current rate of travel of the user, wherein updating the opportunity space comprises increasing or decreasing a magnitude of a slope of the boundaries of the opportunity space; and cause presentation of a representation of the boundaries of the updated opportunity space between the at least one pair of waypoints and the one or more points of interest that are accessible by the user within the updated opportunity space.

2. The system according to claim 1 wherein the opportunity space has a diagonal with a length that is based on the distance between the at least one pair of waypoints, and wherein the opportunity space is partially bounded by a side that is oriented relative to the diagonal at an angle that is at least partially based upon the rate of travel of the user, such that as the rate of travel of the user increases or decreases, the angle respectively increases or decreases thus respectively increasing or decreasing a size of the opportunity space.

3. The system according to claim 1 wherein the at least one memory and the computer program code are further configured to, with the processor, cause the navigation system to receive input modifying the time to be expended by the user between a first pair of waypoints.

4. The system according to claim 3 wherein the at least one memory and the computer program code are configured to, with the processor, cause the navigation system to determine the time to be expended by the user between respective pairs of the waypoints by defining the time to be expended by the user between a second pair of waypoints based upon a predefined time delay between the second pair of waypoints.

5. The system according to claim 4 wherein the at least one memory and the computer program code are further configured to, with the processor, cause the navigation system to redefine the time to be expended by the user between one or more pairs of the waypoints based upon the time, following modification, to be expended by the user between the first pair of waypoints, wherein the at least one memory and the computer program code are configured to, with the processor, cause the navigation system to redefine the time to be expended by the user between one or more pairs of the waypoints without modifying the time to be expended by the user between the second pair of waypoints.

6. The system according to claim 1 wherein the at least one memory and the computer program code are further configured to, with the processor, cause the navigation system to determine a permissible dwell time at a respective point of interest based on the time, the rate of travel of the user and a distance to the respective point of interest.

7. The system of claim 6, wherein the at least one memory and the computer program code that are further configured to, with the processor, cause the navigation system to determine the permissible dwell time at the respective point of interest are further configured to:

determine the permissible dwell time by determining a difference between the time to be expended by the user between the at least one pair of waypoints and a sum of the time expended by the user to travel to and from the respective point of interest.

8. The system of claim 1, wherein the at least one memory and the computer program code are further configured to, with the processor, cause the navigation system to:

identify one or more relevant points of interest of the one or more points of interest that are relevant to the user based on one or more of historical information associated with the user and the venue, historical information associated with the user and one or more other venues different from the venue, or data associated with one or more programs to which the user belongs, wherein causing presentation of the one or more points of interest that are accessible by the user within the opportunity comprises causing presentation of only the one or more relevant points of interest.

9. The system of claim 1, wherein the representation of the portion of the venue including the representation of the one or more points of interest depicts the one or more points of interest so as to be offset from a diagonal defined by the opportunity space by a distance corresponding to a distance to the point of interest from a path extending directly between the respective pair of waypoints.

10. A method for providing navigational assistance at a venue, the method comprising:
obtaining information regarding the venue to be navigated by a user including a plurality of waypoints at the venue and a destination arrival time defining a time at which the user is to arrive at a destination;
detecting, via one or more position sensors, a current rate of travel of the user;
determining a time to be expended by the user between respective pairs of the waypoints at the venue based at least on a product of the current rate of travel of the user and a distance between the respective pairs of the waypoints;
defining an opportunity space between at least one pair of waypoints based on the destination arrival time, the time to be expended between the at least one pair of waypoints, the distance between the at least one pair of waypoints and the current rate of travel of the user;
based on the time and the rate of travel of the user, determining one or more points of interest that are accessible by the user within the opportunity space;
causing presentation of a representation of a portion of the venue including a representation of boundaries of the opportunity space between the at least one pair of waypoints and the one or more points of interest that are accessible by the user within the opportunity space such that arrival of the user at the destination is able to be achieved by the destination arrival time;
detecting, via the one or more position sensors, a change in the current rate of travel of the user;
updating the opportunity space between the at least one pair of waypoints based at least on the change in the current rate of travel of the user, wherein updating the opportunity space comprises increasing or decreasing a magnitude of a slope of the boundaries of the opportunity space; and
causing presentation of a representation of the boundaries of the updated opportunity space between the at least one pair of waypoints and the one or more points of interest that are accessible by the user within the updated opportunity space.

11. The method according to claim 10 wherein the opportunity space has a diagonal with a length that is based on the distance between the at least one pair of waypoints, and wherein the opportunity space is partially bounded by a side that is oriented relative to the diagonal at an angle that is at least partially based upon the rate of travel of the user, such that as the rate of travel of the user increases or decreases, the angle respectively increases or decreases thus respectively increasing or decreasing a size of the opportunity space.

12. The method according to claim 10 further comprising receiving input modifying the time to be expended by the user between a first pair of waypoints.

13. The method according to claim 12 wherein determining the time to be expended by the user between respective pairs of the waypoints comprises defining the time to be expended by the user between a second pair of waypoints based upon a predefined time delay between the second pair of waypoints.

14. The method according to claim 13 further comprising redefining the time to be expended by the user between one or more pairs of the waypoints based upon the time, following modification, to be expended by the user between the first pair of waypoints, wherein redefining the time to be expended by the user between one or more pairs of the waypoints is performed without modifying the time to be expended by the user between the second pair of waypoints.

15. The method according to claim 10 further comprising determining a permissible dwell time at a respective point of interest based on the time, the rate of travel of the user and a distance to the respective point of interest.

16. A computer program product configured to provide navigational assistance at a venue, the computer program product comprising at least one non-transitory computer-readable storage medium having computer-executable program code portions stored therein, the computer-executable program code portions comprising program code instructions configured to:
obtain information regarding the venue to be navigated by a user including a plurality of waypoints at the venue and a destination arrival time defining a time at which the user is to arrive at a destination;
detect, via one or more position sensors, a current rate of travel of the user;
determine a time to be expended by the user between respective pairs of the waypoints at the venue based at least on a product of the current rate of travel of the user and a distance between the respective pairs of the waypoints;
define an opportunity space between at least one pair of waypoints based on the destination arrival time, the time to be expended by the user between the at least one pair of waypoints, the distance between the at least one pair of waypoints and the current rate of travel of the user;
based on the time and the rate of travel of the user, determine one or more points of interest that are accessible by the user within the opportunity space;
cause presentation of a representation of a portion of the venue including a representation of boundaries of the opportunity space between the at least one pair of waypoints and the one or more points of interest that are accessible by the user within the opportunity space such that arrival of the user at the destination is able to be achieved by the destination arrival time;
detect, via the one or more position sensors, a change in the current rate of travel of the user;
update the opportunity space between the at least one pair of waypoints based at least on the change in the current rate of travel of the user, wherein updating the opportunity space comprises increasing or decreasing a magnitude of a slope of the boundaries of the opportunity space; and
cause presentation of a representation of the boundaries of the updated opportunity space between the at least one pair of waypoints and the one or more points of interest that are accessible by the user within the updated opportunity space.

17. The computer program product according to claim 16 wherein the opportunity space has a diagonal with a length that is based on the distance between the at least one pair of waypoints, and wherein the opportunity space is partially bounded by a side that is oriented relative to the diagonal at an angle that is at least partially based upon the rate of travel of the user, such that as the rate of travel of the user increases or decreases, the angle respectively increases or decreases thus respectively increasing or decreasing a size of the opportunity space.

18. The computer program product according to claim 16 wherein the computer-executable program code portions further comprise program code instructions configured to receive input modifying the time to be expended by the user between a first pair of waypoints.

19. The computer program product according to claim 18 wherein the computer-executable program code portions further comprise program code instructions configured to redefine the time to be expended by the user between one or more pairs of the waypoints based upon the time, following modification, to be expended by the user between the first pair of waypoints, wherein the program code instructions are configured to redefine the time to be expended by the user between one or more pairs of the waypoints without modifying the time to be expended by the user between a second pair of waypoints for which the time to be expended by the user is based upon a predefined time delay.

20. The computer program product according to claim 16 wherein the computer-executable program code portions further comprise program code instructions configured to determine a permissible dwell time at a respective point of interest based on the time, the rate of travel of the user and a distance to the respective point of interest.

* * * * *